United States Patent

Suzuki

[11] Patent Number: 5,838,358
[45] Date of Patent: Nov. 17, 1998

[54] IMAGE FORMING APPARATUS FOR OPTIMIZING SMOOTHING PROCESSING BASED ON DEVELOPMENT USED CHARACTERISTIC OF IMAGE CARTRIDGE AND CARTRIDGE THEREOF

[75] Inventor: Katsunori Suzuki, Langenhagen, Germany

[73] Assignee: Minolta Co., Ltd., Osaka, Japan

[21] Appl. No.: 730,435

[22] Filed: Oct. 15, 1996

Related U.S. Application Data

[63] Continuation of Ser. No. 277,042, Jul. 19, 1994.

[30] Foreign Application Priority Data

Jul. 30, 1993 [JP] Japan .................................. 5-190180

[51] Int. Cl.⁶ ...................................................... B41J 2/47
[52] U.S. Cl. ............................................. 347/247; 347/153
[58] Field of Search ............................... 347/19, 14, 262, 347/264, 153, 247; 358/296, 300; 399/12, 13

[56] References Cited

U.S. PATENT DOCUMENTS

| | | | |
|---|---|---|---|
| 4,961,088 | 10/1990 | Gilliland et al. | 355/206 |
| 4,994,853 | 2/1991 | Fukuchi et al. | 399/12 |
| 5,029,108 | 7/1991 | Lung | 364/519 |
| 5,289,210 | 2/1994 | Takayanagi | 347/14 |
| 5,410,641 | 4/1995 | Wakabarashi et al. | 347/86 |
| 5,450,208 | 9/1995 | Murata | 347/19 |

*Primary Examiner*—Mark J. Reinhart
*Attorney, Agent, or Firm*—Sidley & Austin

[57] ABSTRACT

A CPU in the main body of the apparatus reads out data for smoothing processing from a ROM in an image cartridge for output to a smoothing circuit. The smoothing circuit performs a prescribed smoothing processing based on the data for smoothing processing and outputs the smoothed image data through an input/output control circuit and a printer engine interface circuit to a printer engine which forms an image. As a result, an optimum image processing suitable for any development characteristic can be performed for an image cartridge which is not compatible with the data for image processing of the main body, and a good quality image can be formed.

16 Claims, 6 Drawing Sheets

IMAGE FORMING APPARATUS FOR OPTIMIZING SMOOTHING PROCESSING BASED ON DEVELOPMENT USED CHARACTERISTIC OF IMAGE CARTRIDGE AND CARTRIDGE THEREOF

This application is a continuation of application Ser. No. 08/277,042, filed Jul. 19, 1994.

BACKGROUND OF THE INVENTION

1. Field of the Invention

The present invention relates generally to image forming apparatuses, and more specifically, to an image forming apparatus for forming an image processed in a prescribed manner, using a detachable image cartridge.

2. Description of the Background Art

In the field of image forming apparatuses, especially printers, various image processing functions have been developed with the advancement of image processing technology. One of such image processing functions is a smoothing function to convert a picture image into an image with a higher definition than the original by means of interpolation or the like according to the form of periphery of bits forming the image. The smoothing function is for example disclosed in U.S. Pat. No. 5,029,108.

A conventional image forming apparatus having such a smoothing function will be described by way of illustrating a printer in conjunction with the accompanying drawings.

FIG. 7 is a block diagram showing the configuration of the conventional image forming apparatus.

In FIG. 7, the image forming apparatus includes a printer controller 300, a printer engine interface circuit 10, a panel interface circuit 11, and a host interface circuit 12.

Printer controller 300 includes a CPU (Central Processing Unit for control) 1, a code ROM (Read Only Memory) 2, data ROM 3, a DRAM (Dynamic Random Access Memory) 4, a smoothing circuit 5, a memory control circuit 6, an input/output control circuit 7, a data bus 9, and an address bus 8.

Printer controller 300 is connected to printer engine interface circuit 10, panel interface circuit 11, and host interface circuit 12.

CPU 1 is connected to data bus 9 and address bus 8 and controls data transfer and the operation of each circuit. Code ROM 2 is connected to memory control circuit 6 and data bus 9, and stores programs which will be executed by CPU 1. Data ROM 3 is connected to memory control circuit 6 and data bus 9, and stores data such as font used in the operation of CPU 1, data for smoothing processing used by smoothing circuit 5 and the like. DRAM 4 is connected to memory control circuit 6 and data bus 9, and stores work area used by CPU 1, data such as picture images to be printed and the like. Smoothing circuit 5 is connected to memory control circuit 6 and input/output control circuit 7 and performs the smoothing function. Memory control circuit 6 is connected to address bus 8 and selects a device corresponding to a prescribed address designated by CPU 1. Input/output control circuit 7 is connected to data bus 9, address bus 8, smoothing circuit 5, printer engine interface circuit 10, panel interface circuit 11, and host interface circuit 12. CPU 1 communicates with printer engine interface 10, panel interface circuit 11 and host interface circuit 12 through input/output control circuit 7. Printer engine interface circuit 10 is connected to a printer engine 13 and controls input/output to/from the printer engine portion. Panel interface circuit 4 is connected to an operation panel (not shown) of a copying machine and controls input/output to/from the operation panel. Host interface circuit 12 is connected to an external host computer (not shown) and controls input/output from/to the host computer.

The operation of thus configured printer will be described. Image data is usually output to host interface circuit 12 from the host computer based on a particular protocol. The image data is output to CPU 1 through host interface circuit 12 and input/output control circuit 7. CPU 1 analyzes the input image data and develops a picture image in DRAM 4. After the image development is completed, CPU 1 outputs an instruction of initiating printing to the printer engine through input/output control circuit 7 and printer engine interface circuit 10. At the time, the image data stored in DRAM 4 is transferred to smoothing circuit 5 through input/output control circuit 7 in synchronization with a sync signal output from printer engine interface circuit 10. Smoothing circuit 5 inspects the periphery of a target dot in the transferred image data and performs a smoothing processing to convert the image data into data with a resolution higher than that in DRAM 4 by means of interpolation or the like. Smoothing circuit 5 uses data for smoothing processing read out from data ROM 3 and performs a smoothing processing as described above and suitable for the development characteristic of the attached image cartridge (not shown). The image data converted into data with a higher resolution is output to the printer engine in synchronization with a sync signal generated by printer engine interface circuit 10. The smoothed image data is output to printer engine 13. Printer engine 13 modulates a laser beam emitted from a laser diode 14 based on the image data, and directs the beam upon a photoreceptor (not shown). At the time, printer engine 13 operates each element of the image cartridge such as the photoreceptor and a flexible sleeve as well (as will be discussed below). Thus, a latent electrostatic image formed on the photoreceptor by the laser beam is developed by the flexible sleeve and an image is formed on paper as a result.

The conventional image forming apparatus as described above stores data for smoothing processing in data ROM 3. Therefore, if an image is formed with an image cartridge having a development characteristic not compatible with the data for smoothing processing stored in data ROM 3, the following problem is encountered.

FIGS. 8 and 9 are graphs showing the relation between laser beam emitting time and print density for toner having different development characteristics. In FIGS. 8 and 9, 100% laser beam emitting time is emitting time for 1 dot.

In order to produce ½ the density of 1 dot, about 40% laser beam emitting time is necessary with the toner in FIG. 8, while at least 60% laser beam emitting time is necessary with the toner in FIG. 9. For 30% laser beam emitting time, the toner in FIG. 8 produces about ¼ print density, while the toner in FIG. 9 is not able to print a dot formed from only 30% laser beam emitting. Accordingly, conducting a smoothing processing having optimized laser beam emitting time with the toner in FIG. 8 does not provide a successful result. If therefore the image cartridge is changed and the characteristic of the toner changes, a smoothing processing based on the characteristic of toner must be performed and therefore data for smoothing processing based on the characteristic of each toner must be supplied to smoothing circuit 5. Data for smoothing processing is however stored in data ROM 3 as described above and cannot be changed. As a result, if an image cartridge having a development characteristic other than preset data is used, optimized smoothing processing cannot be achieved and thus an image of good quality cannot be formed.

SUMMARY OF THE INVENTION

It is an object of the invention to provide an image forming apparatus capable of performing optimum image processing suitable for the characteristic of an element included in a cartridge and forming a good quality image.

Another object of the invention is to provide an image forming apparatus capable of performing optimum smoothing processing suitable for the development characteristic of a developer included in a cartridge and forming a good quality image.

Yet another object of the invention is to provide an image forming apparatus capable of performing optimum image processing suitable for the characteristic of an element included in a cartridge which is not compatible with the data for image processing of the main body and forming a good quality image.

A still further object of the invention is to provide a cartridge suitable for an image forming apparatus which forms an image of good quality smoothed in a suitable manner for the characteristic of a developer included in a cartridge.

In an image forming apparatus according to one aspect of the invention, a cartridge includes a memory which stores data for image processing based on a characteristic of an element, a prescribed image processing is performed to image data based on the data for image processing, and an image is formed using the element based on the processed image data. Accordingly, an optimum image processing suitable for the characteristic of the element included in the cartridge is enabled, and thus a good quality image can be formed.

In an image forming apparatus according to another aspect of the invention, a cartridge includes a memory which stores data for smoothing processing based on the development characteristic of a developer, a smoothing processing is performed to image data based on the data for smoothing processing, and an image is formed using the developer based on the smoothed image data. Accordingly, an optimum smoothing processing suitable for the development characteristic of a developer included in the cartridge can be performed and a good quality image can be formed.

In an image forming apparatus according to a still further aspect of the invention, the main body includes a first memory which stores data for image processing and a determination unit for determining whether or not the cartridge includes a second memory which stores data for image processing, and if the cartridge includes the second memory, a prescribed image processing is performed to image data based on the data for image processing in the second memory, while if the cartridge does not include the second memory, a prescribed image processing is performed to image data based on the data for image processing in the first memory. Then, an image is formed using the element based on the image data processed based on each data for image processing. Accordingly, an optimum image processing suitable for the characteristic of the element included in the cartridge is enabled even if the cartridge is not compatible with data for image processing in the main body, and thus a good quality image can be formed.

In a cartridge according to a still further aspect of the invention, since the cartridge includes a memory which stores data for smoothing processing, a smoothing processing suitable for the development characteristic of the developer of the cartridge is enabled and therefore a good quality image can be formed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
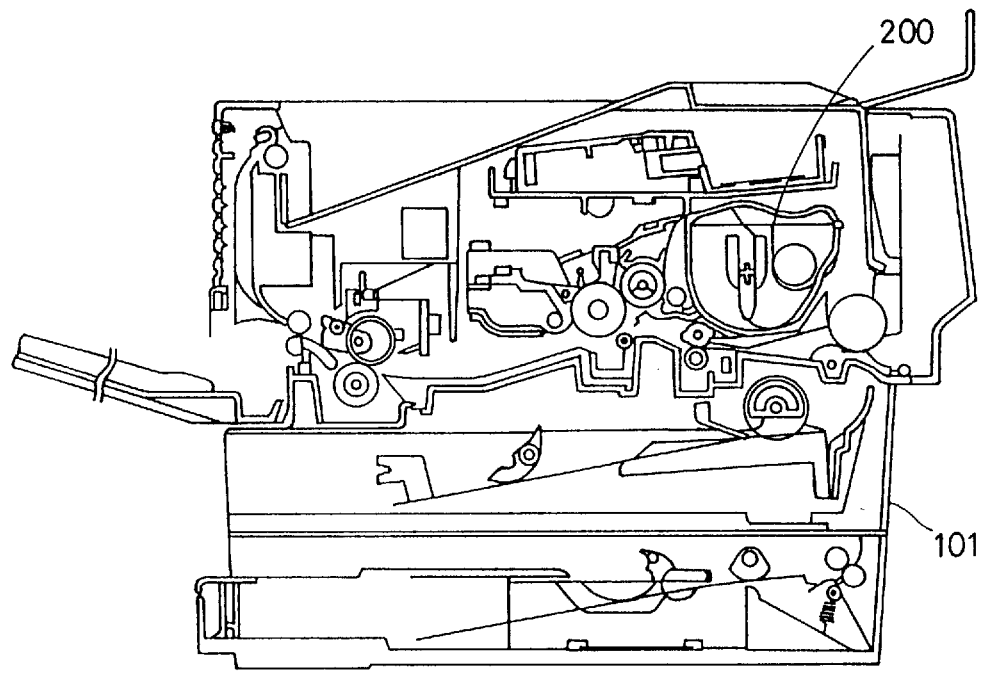
FIG. 2 is a view showing the mechanical configuration of an image forming apparatus according to one embodiment of the present invention.

Now, an image forming apparatus according to one embodiment of the invention will be described by way of illustrating a printer in conjunction with the accompanying drawings. FIG. 2 is a diagram showing the configuration of the printer according to the embodiment of the invention.

In FIG. 2, the printer includes a printer main body 101 and an image cartridge 200.

Figure 3:
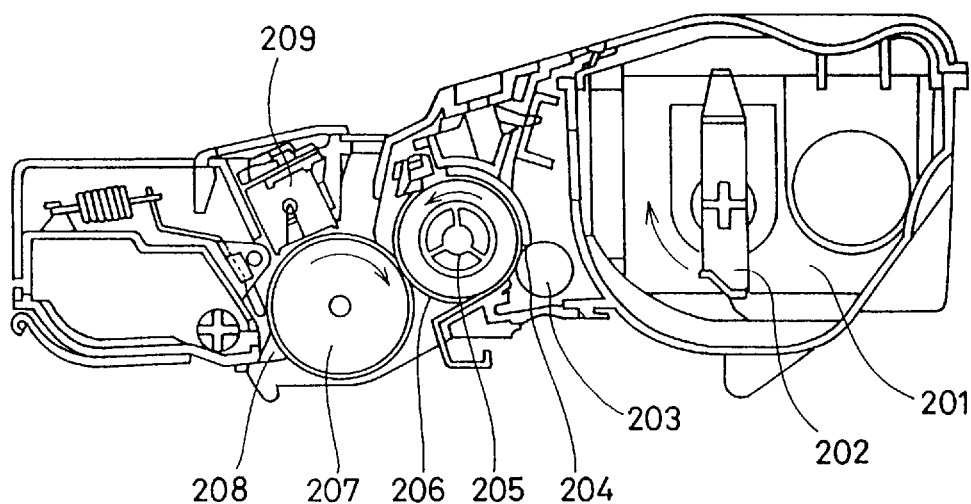
FIG. 3 is a view showing the configuration of the image cartridge shown in FIG. 2.

Image cartridge 200 will be described first in conjunction with the drawings. FIG. 3 is a view showing the configuration of image cartridge 200. In FIG. 3, image cartridge 200 contains a plurality of associated elements including toner (not shown), a developer, which, itself, includes a toner hopper 201, a toner agitating screw 202, a toner transport roller 203, a doctor blade 204, a sleeve roller 205 and a flexible sleeve 206; a photoreceptor 207, a cleaning blade 208 and a charger 209.

Toner hopper 201 stores toner. Toner agitating screw 202 agitates toner in toner hopper 201, and feeds toner to toner transport roller 203. Toner transport roller 203 sends the toner to sleeve roller 205. Doctor blade 204 spreads the toner thinly on flexible sleeve 206. Sleeve roller 205 rotates flexible sleeve 206. Flexible sleeve 206 sends the toner onto a surface of photoreceptor 207. Cleaning blade 208 removes, or cleans, excess toner. Charger 205 charges photoreceptor 7. Thus, image cartridge 200 can develop a prescribed image.

Figure 4:
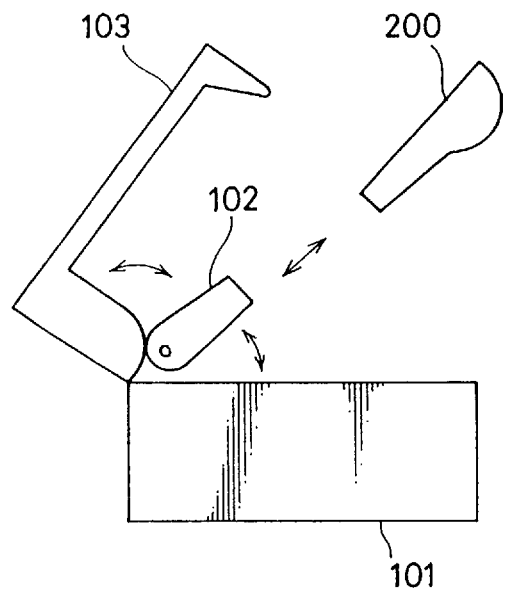
FIG. 4 is a diagram for use in illustration of how the image cartridge of the image forming apparatus shown in FIG. 2 is detached/attached from/to the printer main body.

A description follows on how image cartridge 200 is attached to/detached from printer main body 101. FIG. 4 shows how image cartridge 200 is attached to/detached from printer main body 101.

In FIG. 4, printer main body 101 includes an upper cover 103, and a support frame 102. As illustrated in FIG. 4, lifting upper cover 103 pivots support frame 102 upward, and image cartridge 200 is attached to support frame 102 for mounting to printer main body 101. Thus, image cartridge 200 can be detached/attached from/to printer main body 101.

Figure 5:
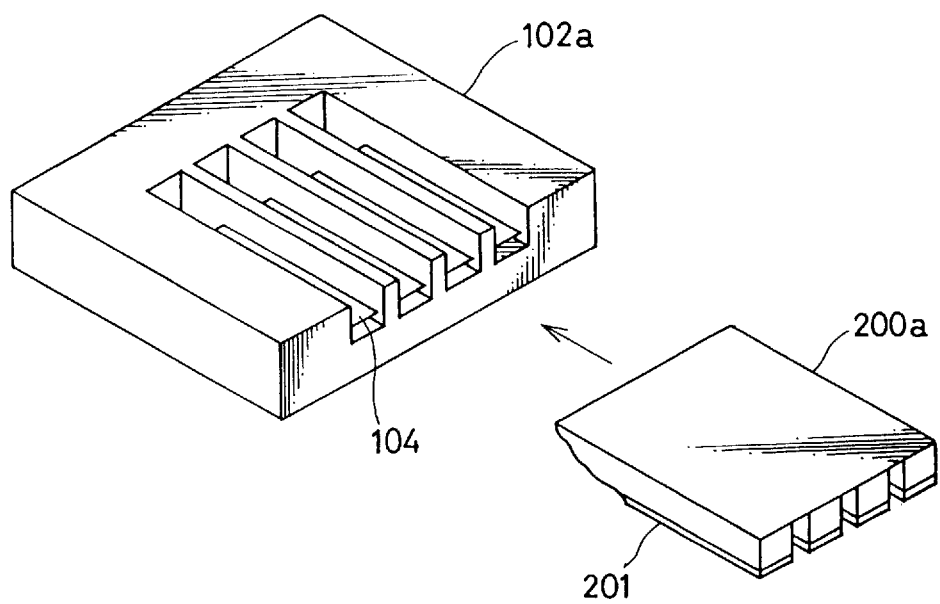
FIG. 5 is a view showing how the image cartridge shown in FIG. 4 is electrically connected with the printer main body.

Now, electrical connection between image cartridge 200 and printer main body 101 will be described. FIG. 5 is a view showing how image cartridge 200 and support frame 102 are electrically connected. As illustrated in FIG. 5, a plurality of grooves are formed at part 102a of support frame 102, and plate-shaped electrical contacts 104 are provided in the grooves. Meanwhile, a plurality of projecting portions are formed at part 200a of image cartridge 200 with plate-shaped electrical contacts 201 being provided on surfaces of the projecting portions. Therefore, connecting electrical contacts 104 and electrical contacts 201 as illustrated in FIG. 5 establishes electrical connection between image cartridge 200 and printer main body 100.

Figure 1:
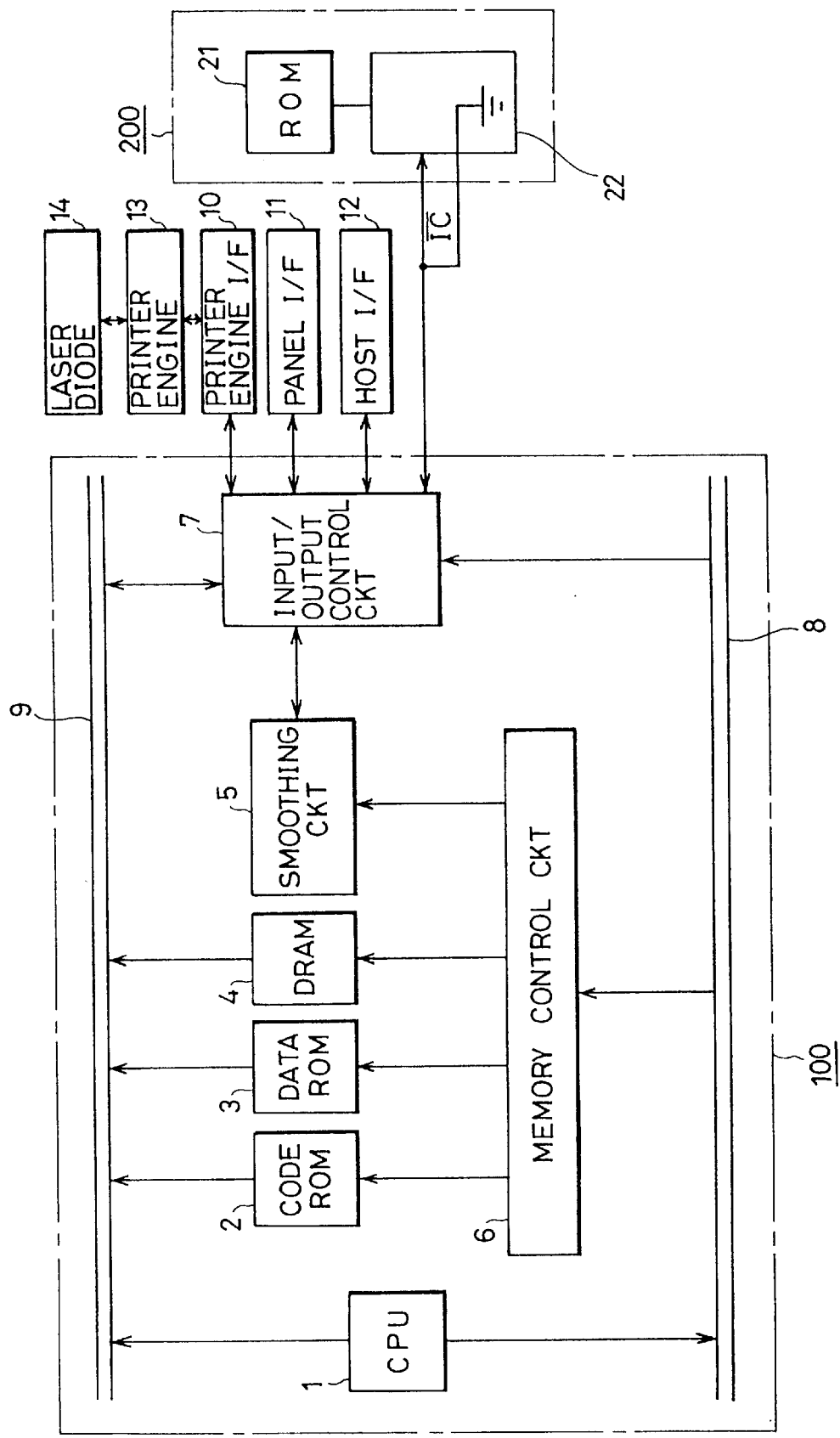
FIG. 1 is a diagram showing the electric configuration of an image forming apparatus according to one embodiment of the present invention.

The electrical configuration of thus structured printer will be described. FIG. 1 is a diagram showing the electrical configuration of an image forming apparatus according to one embodiment of the present invention.

Figure 7:
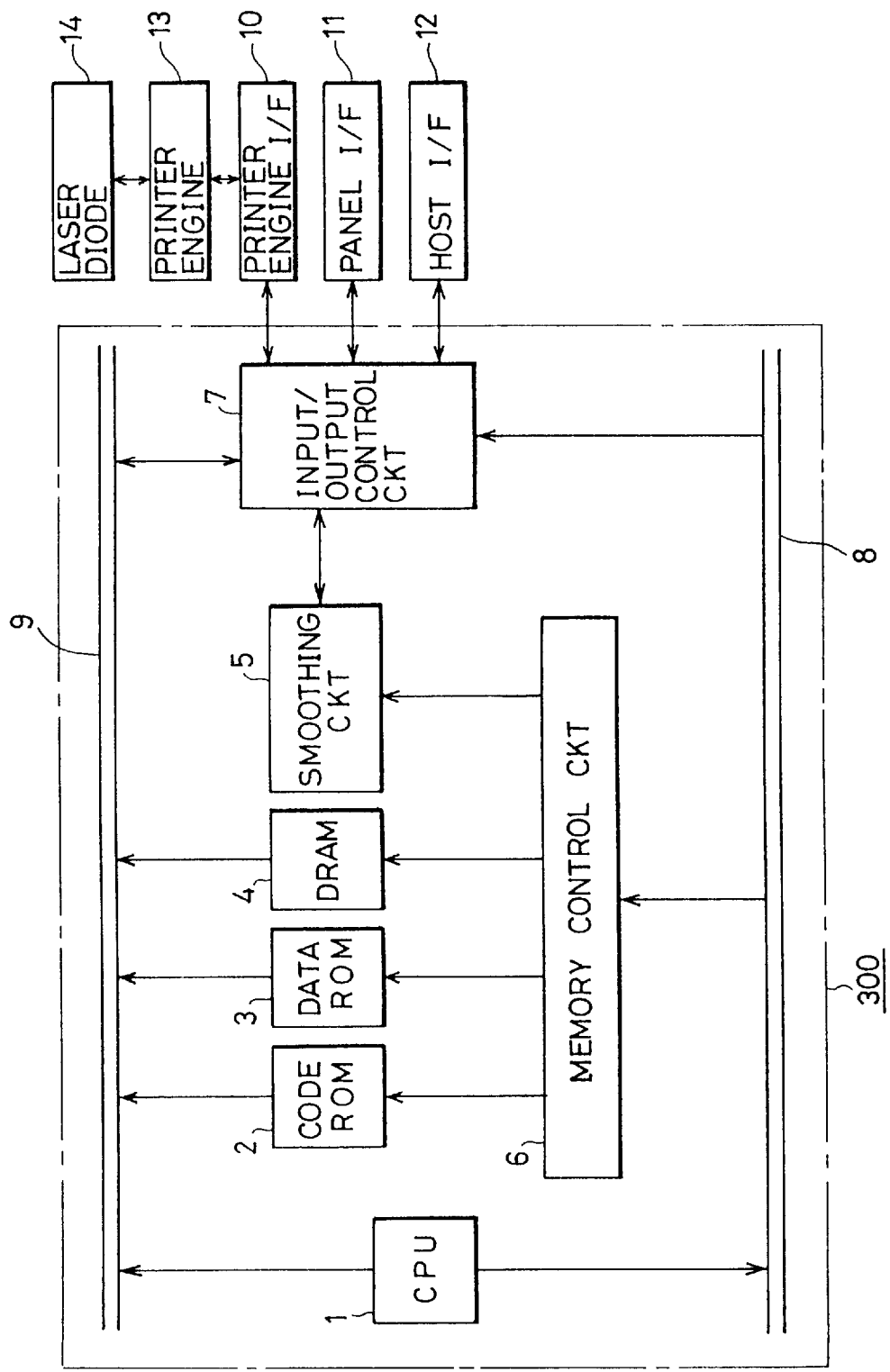
FIG. 7 is a diagram showing the electrical configuration of a conventional image forming apparatus.
Figure 8:
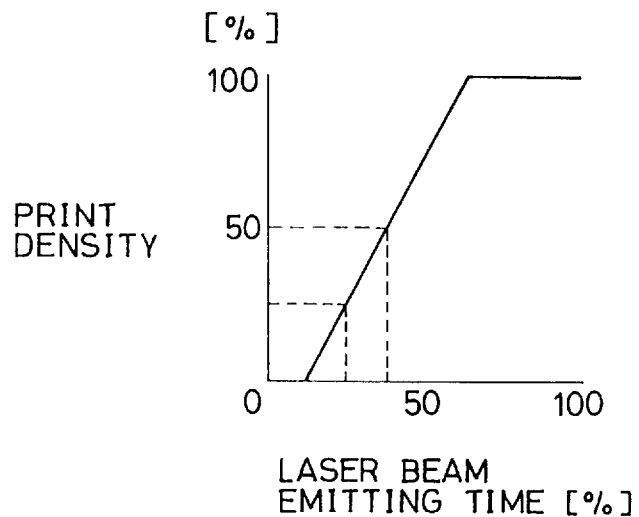
FIG. 8 is a first graph showing the relation between print densities and laser beam emitting time.
Figure 9:
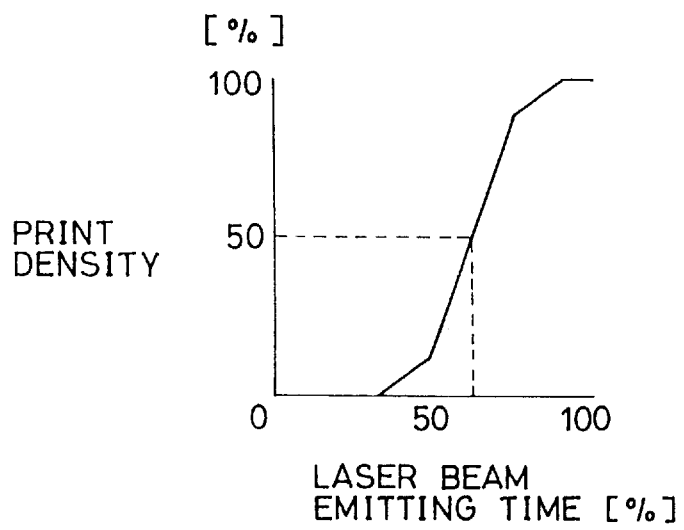
FIG. 9 is a second graph showing the relation between print densities and the laser beam emitting time.

The configuration in FIG. 1 is different from FIG. 7 in that image cartridge 200 and printer controller 100 are electrically connected.

Image cartridge 200 includes a ROM (Read Only Memory) 21 and an image cartridge interface circuit 22.

ROM 21 is connected with image cartridge interface circuit 22. ROM 21 stores data for smoothing processing. The data is produced based on a development characteristic unique to the characteristic of toner or the like of image cartridge 200, and an image processing circuit comprising smoothing circuit 5 can perform an optimum smoothing processing using the data. If, for example, data for smoothing processing as disclosed in U.S. Pat. No. 5,029,108 is applied to smoothing circuit 5, data as illustrated in FIG. 15 in U.S. Pat. No. 5,029,108 is stored.

Image cartridge interface circuit 22 is connected with input/output control circuit 7. Image cartridge interface circuit 22 outputs data in ROM 21 addressed by CPU 1 to input/output control circuit 7. Input/output control circuit 7 transfers the read out data for smoothing processing to smoothing circuit 5, which stores the data transferred thereto and performs a prescribed smoothing processing based on the data.

One signal line between image cartridge interface circuit 22 and input/output control circuit 7 is connected with ground potential in image cartridge interface circuit 22. A signal transmitted on the signal line is used as a determination signal $\overline{IC}$ for determining whether or not image cartridge 200 includes image interface circuit 22. Determination signal $\overline{IC}$ is output to CPU 1 through input/output control circuit 7, and CPU 1 determines that the image cartridge includes image cartridge interface circuit 22 in response to determination signal $\overline{IC}$ at ground potential, and otherwise determines that the image cartridge does not include image cartridge interface circuit 22.

Figure 6:
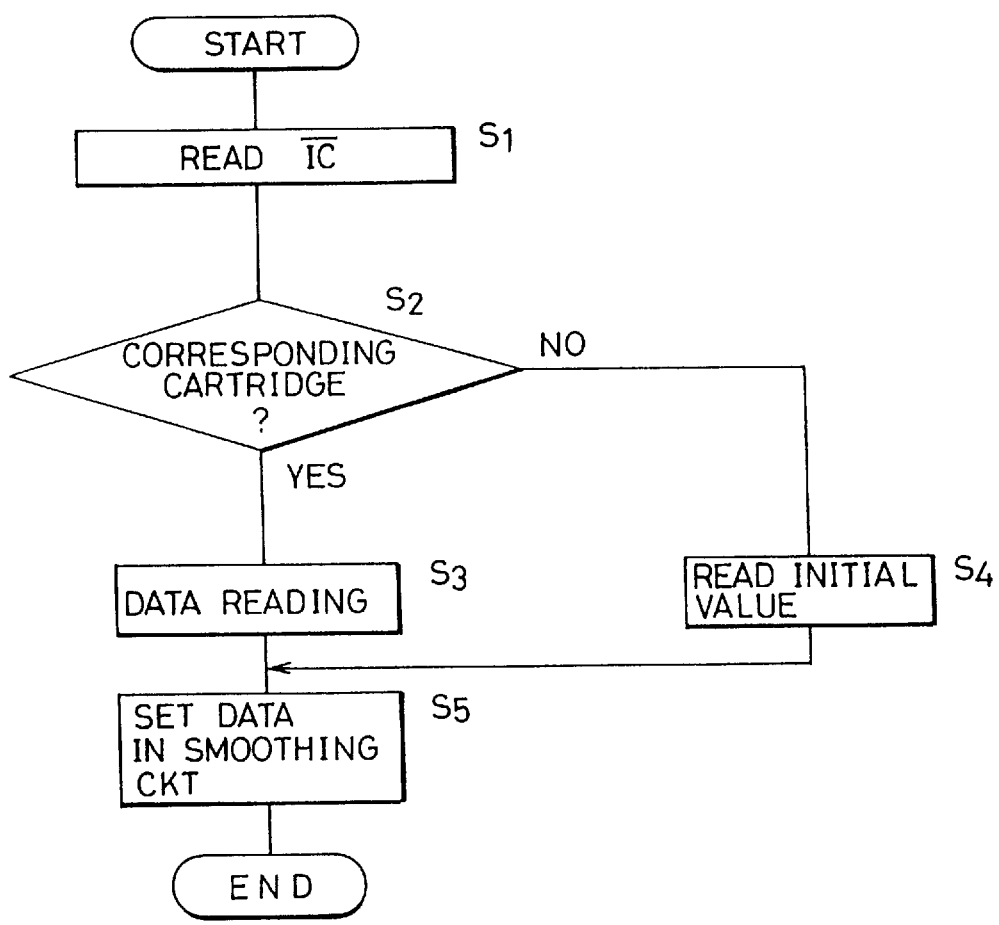
FIG. 6 is a flow chart for use in illustration of the operation of the image forming apparatus shown in FIG. 1.

Now, the operation of thus configured printer will be described. FIG. 6 is a flow chart for use in illustration of the operation of an image forming apparatus according to the present invention. The program in the flow chart shown in FIG. 6 is read out from code ROM 2 by CPU 1 for execution when the power supply is turned on.

In step S1, CPU 1 reads determination signal $\overline{IC}$.

Then in step S2, CPU 1 determines whether or not the attached image cartridge includes toner cartridge interface circuit 22. More specifically, if determination signal $\overline{IC}$ is a signal at ground potential, the attached image cartridge is determined to include image cartridge interface circuit 22, and the operation proceeds to step S3. On the other hand, if determination signal $\overline{IC}$ is a signal other than the signal at ground potential, it is determined that the image cartridge does not include image cartridge interface circuit 22, and the operation proceeds to step S4.

Then, in step S3, CPU 1 reads data for image processing. Based on the determination in step S2, since the attached image cartridge has stored data for smoothing processing according to a development characteristic of its own in ROM 21, CPU 1 reads out the data for smoothing processing through input/output control circuit 7 and image cartridge interface circuit 22.

The image cartridge which does not include image cartridge interface circuit 22 does not include ROM 21 storing data for smoothing processing, and therefore in step S4 CPU 1 reads out data for smoothing processing from data ROM 3.

Then in step S5, CPU 1 sets the data for smoothing processing read out in step S3 or step S4 in smoothing circuit 5.

As in the foregoing, in this embodiment, since ROM 21 storing data for smoothing processing is provided in image cartridge 200, an optimum image processing is enabled, i.e., a processing suitable for the development characteristic of an image cartridge which does not include corresponding data for smoothing processing in data ROM 3, and thus a good quality image can be formed.

In the above embodiment, the image processing has been described by way of illustrating a smoothing processing, the present invention is applicable to any image processing susceptible to the influence of development characteristic. Note that the configuration of the image cartridge is not limited to the above, and the invention is similarly applicable to any cartridge including a portion affecting the development characteristic of toner or the like.

Although the present invention has been described and illustrated in detail, it is clearly understood that the same is by way of illustration and example only and is not to be taken by way of limitation the spirit and scope of the present invention being limited only by the terms of the appended claims.

What is claimed is:

1. An image forming apparatus which processes image data to form an image on an image holding member for reproduction, said image forming apparatus comprising:

a detachable cartridge having a plurality of associated elements to form an image on said image holding member, at least one of said plurality of associated elements having an electrostatic latent image formation characteristic, and a memory to store data corresponding to said latent image formation characteristic(s) for a prescribed image processing of image data;

an image processing circuit for processing image data in accordance with said electrostatic latent image formation characteristic data stored in said memory; and image forming means for forming an image on said image holding member, using said plurality of associated elements, with image data processed by said image processing circuit.

2. An image forming apparatus as recited in claim 1, wherein said plurality of associated elements includes a photoreceptor for holding a latent image and a developer for developing the latent image on said photoreceptor.

3. An image forming apparatus as recited in claim 1, wherein said image processing circuit includes a smoothing circuit, wherein said smoothing circuit performs a smoothing operation during said prescribed image processing.

4. An image forming apparatus which receives image data from a coupled host computer and processes said image data to form a latent image on a photoreceptor for reproduction, said image forming apparatus comprising:

a removable cartridge having at least:
  a developer having an electrostatic latent image development characteristic for developing said latent image on said photoreceptor, and
  a memory for storing smoothing data for a smoothing process for said image data, said smoothing process being susceptible to the influence of said latent image development characteristic of said developer;
an interface circuit, connected to said host computer, for accepting image data from said host computer;
a smoothing circuit, connected to said interface circuit, for performing said smoothing process based on said smoothing data stored in said memory; and
latent image forming means for forming said latent image on said photoreceptor based on the image data smoothed by said smoothing circuit.

5. An image forming apparatus as recited in claim 4, wherein said smoothing circuit comprises a circuit which increases a resolution of said image data.

6. An image forming apparatus which processes image data to form an image on an image holding member for reproduction, said image forming apparatus comprising:

an image processing circuit for processing image data based on prescribed data for image processing;
a detachable cartridge having a plurality of associated elements for forming said image on said image holding member based on the image data processed by said image processing circuit;
a first memory for storing prescribed data for image processing by said image processing circuit;
determination means for determining whether said cartridge has a second memory, said second memory storing data for image processing by said image processing circuit which corresponds to said plurality of associated elements of said cartridge;
reading means for reading out the data of said second memory in response to a determination by said determination means that said cartridge has a second memory, and for reading out the prescribed data of said first memory in response to a determination by said determination means that said cartridge does not have a second memory; and
setting means for setting the data for image processing read out by said reading means.

7. An image forming apparatus as recited in claim 6, wherein said plurality of associated elements includes a photoreceptor for holding a latent image and a developer for developing the latent image on said photoreceptor.

8. An image forming apparatus as recited in claim 6, wherein said image processing circuit includes a smoothing circuit for smoothing said image data.

9. An image forming apparatus as recited in claim 6, wherein said determination means includes means for detecting whether or not said cartridge has an interface circuit and determines whether or not said cartridge has said second memory based on a result of said detection.

10. A cartridge detachably provided to an image forming apparatus for forming a developed image on a photoreceptor based on image data subjected to a smoothing processing by a smoothing circuit provided in said image forming apparatus externally of said cartridge, comprising:

a photoreceptor for holding a latent image;
a developer for developing the latent image to form said developed image on said photoreceptor; and
a memory storing data for said smoothing processing by said externally provided smoothing circuit.

11. A cartridge attachable to an image forming apparatus having an image processing circuit for processing received image data, said cartridge comprising:

a plurality of associated forming elements to form an image based on said processed image data, wherein at least one of said plurality of forming elements has an electrostatic image formation characteristic and said processing of said image data is susceptible to an influence of said electrostatic image formation characteristic of said at least one of said plurality of forming elements; and
a memory having data stored for said image data processing, such stored data corresponding to said electrostatic image formation characteristic of said at least one of said plurality of forming elements, wherein said image processing circuit performs said processing of said image data based on said stored data in said memory.

12. A cartridge as claimed in claim 11, wherein said plurality of associated forming elements includes a photoreceptor for holding a latent image and a developer for developing the latent image on said photoreceptor.

13. A cartridge as claimed in claim 11, wherein said image processing circuit includes a smoothing circuit for smoothing said received image data in accordance with said data stored in said memory.

14. An image forming method for use in an image forming apparatus having a detachably removable cartridge having a plurality of associated elements, at least one of said plurality of associated elements having an electrostatic latent image formation characteristic, and a memory storing data, said data corresponding to said latent image formation characteristic(s) of said plurality of associated elements, said image forming method comprising the steps of:

reading said data from said memory for a prescribed image processing of image data, said prescribed image processing being susceptible to influence by said latent image formation characteristic of said at least one said plurality of associated elements;
performing said prescribed image processing of said image data based on said data read from said memory; and
forming an image on an image holding member using said plurality of associated elements based on said processed image data.

15. The image forming method as claimed in claim 14, wherein said cartridge further includes said image holding member, said image holding member being a photoreceptor for holding a latent image, and a developer for developing the latent image on said photoreceptor.

16. The image forming method as claimed in claim 14, wherein said prescribed image processing includes a smoothing processing, and said data read from said memory is related to said smoothing processing.

* * * * *